(No Model.) 2 Sheets—Sheet 1.
C. A. CARLSON.
VALVE FOR STEAM ENGINES.
No. 510,116. Patented Dec. 5, 1893.
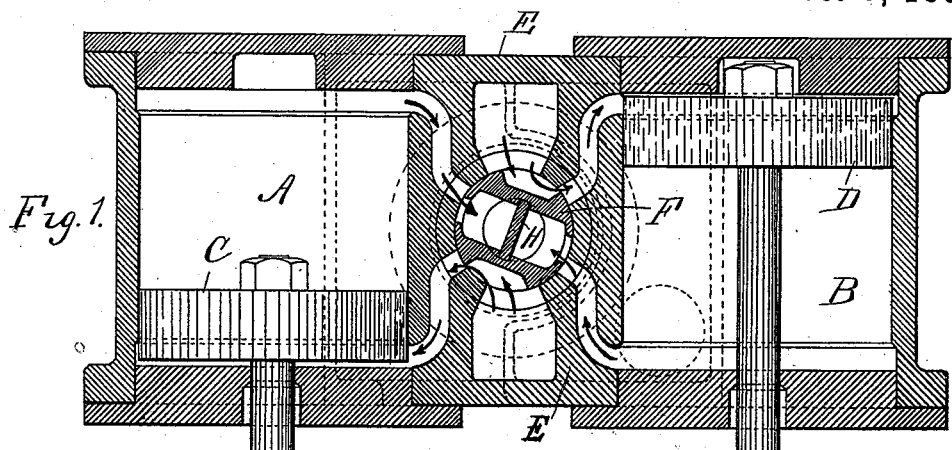
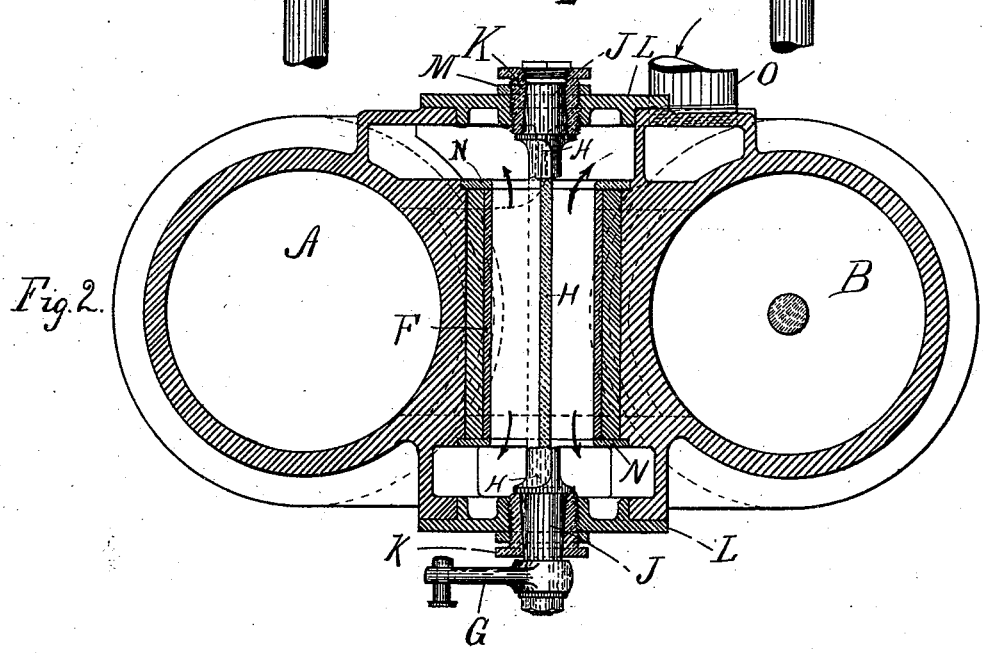
WITNESSES:
Edwin G. Loomis
Frank D. Witherell
INVENTOR
Carl A. Carlson
BY
A. S. Spencer
ATTORNEY.

(No Model.) 2 Sheets—Sheet 2.

C. A. CARLSON.
VALVE FOR STEAM ENGINES.

No. 510,116. Patented Dec. 5, 1893.

WITNESSES:
Elihu G. Loomis
Frank D. Witherell

INVENTOR
Carl A. Carlson
BY
A. N. Spencer
ATTORNEY.

THE NATIONAL LITHOGRAPHING COMPANY,
WASHINGTON, D. C.

UNITED STATES PATENT OFFICE.

CARL A. CARLSON, OF BOSTON, MASSACHUSETTS.

VALVE FOR STEAM-ENGINES.

SPECIFICATION forming part of Letters Patent No. 510,116, dated December 5, 1893.

Application filed July 2, 1892. Serial No. 438,786. (No model.)

*To all whom it may concern:*

Be it known that I, CARL A. CARLSON, of Boston, in the county of Suffolk and State of Massachusetts, have invented certain new and useful Improvements in Valves for Steam-Engines, of which the following, taken in connection with the accompanying drawings, is a specification.

My invention is an oscillating valve, cylindrical in its general form but having reversely tapered journals working in correspondingly tapered bearings externally threaded for adjustment to compensate for wear. These journals are at the extremities of an axial bar of steel or wrought iron to which the valve metal is cast firmly, thus securing strength and durability. This bar, continuous through the valve from end to end, forms a partition, separating the live from the exhaust steam in compound engines, or divides the exhaust steam escaping from the two cylinders of a double acting engine, into two currents each emerging from both ends of the valve. The threaded bearings are provided with check-nuts which bear against the outer face of the steam-chest cover, to hold the bearings when adjusted. The valve is peculiar in being open at both ends to receive or to discharge steam simultaneously from both ends, the steam so admitted to the hollow interior of the valve being either live steam or exhaust according to construction as will be explained. The valve has also peripheral recesses forming parts of the steam passages, so that it is fitted for use either with engines having two double acting cylinders or with the cylinders of a compound engine wherein the steam is used successively and expansively, as herein shown. The valve is placed between the cylinders, with its axis in a plane at right angles to theirs. Metallic rings, for packing the valve, cover each of its ends, to prevent escape of steam between the valve and its casing.

Figure 3:
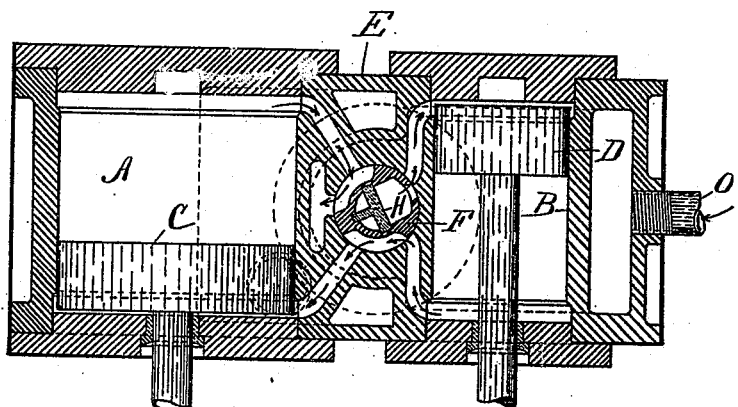
Figure 4:
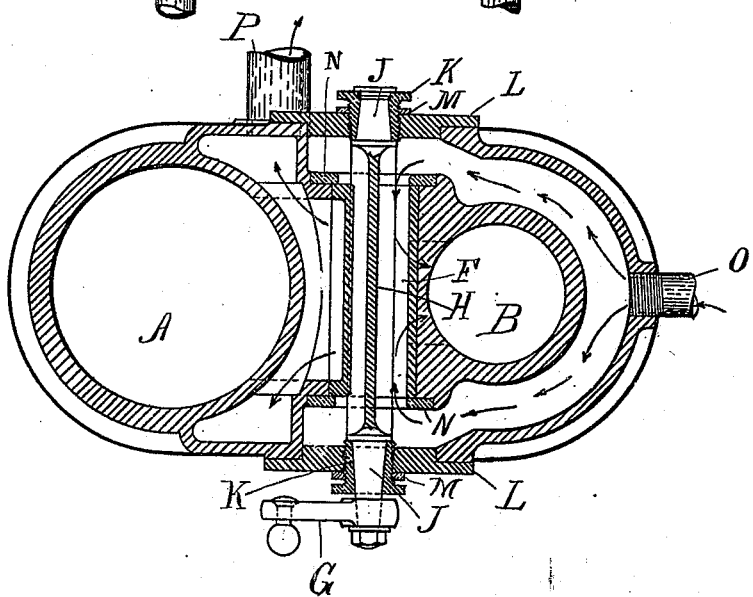

In the drawings Figures 1 and 2 are respectively transverse and longitudinal sections through my valve shown as applied to the two cylinders of a double-acting engine. Figs. 3 and 4 are like views of my valve applied to the cylinders of a compound engine.

A and B represent the two cylinders in either view, and C D the pistons therein.

E is the casing between the cylinders, constituting the steam chest in which the valve F oscillates, the crank G being actuated by suitable means.

H is a steel or wrought iron bar, flat as in Figs. 1 and 2 or T-shaped in cross section as in Figs. 3 and 4, forming the longitudinal shaft of the valve to which the crank is applied and constituting a partition from end to end of the valve. The body F of the valve is cast rigidly upon this central bar and is turned true upon centers in the ends of the bar. Tapering journals J, near the ends of the bar H, oscillate within the bearings K correspondingly tapered, and externally threaded to screw into the covers L, which close the ends of the steam chest or valve-casing E. This tapered and threaded formation permits tightening these bearings in case they become worn. Check-nuts M are furnished to secure permanence of position to the bearings or threaded bushings, when adjusted.

At each open end of the valve, I provide a metallic packing-ring N, bolted to the casing or walls of the cylinders to keep the valve steam tight. These rings serve also to resist any longitudinal movement of the valve.

The course of the steam is as indicated by the arrows, steam entering through the pipe O and escaping through the outlet P.

I claim as my invention—

1. An oscillating valve open for the passage of steam through both its ends, furnished with a shaft continuous from bearing to bearing and forming a longitudinal partition through such open steam-space, said valve being adapted to supply steam simultaneously to two cylinders located on opposite sides of said valve, substantially as set forth.

2. An oscillating valve having a body circular in cross-section and suitably cored for steam ports and passages, in combination with a shaft formed distinct from but rigidly secured to said body and running continuously from end to end thereof, the end portions of such shaft forming the journals of the valve, substantially as set forth.

3. An oscillating valve, open from end to end for the passage of steam, and provided with metallic packing rings fixed in position to prevent longitudinal movement of the valve and escape of steam, substantially as set forth.

In testimony whereof I have signed my name to this specification, in the presence of two subscribing witnesses, on this 28th day of June, A. D. 1892.

CARL. A. CARLSON.

Witnesses:
 A. H. SPENCER,
 CHARLES H. KEYES.